US005529842A

United States Patent [19]

Hoshizaki et al.

[11] Patent Number: 5,529,842

[45] Date of Patent: Jun. 25, 1996

[54] CHARGE ROLL FOR ELECTROPHOTOGRAPHY

[75] Inventors: Taketoshi Hoshizaki; Masato Ono; Kazuhiro Koseki; Yukihiro Ishii; Kozo Oka, all of Minamiashigara, Japan

[73] Assignee: Fuji Xerox Co., Ltd., Tokyo, Japan

[21] Appl. No.: 317,607

[22] Filed: Sep. 29, 1994

[30] Foreign Application Priority Data

Oct. 1, 1993 [JP] Japan .................................... 5-267773

[51] Int. Cl.[6] ............................ G03G 15/14; B32B 5/16; B32B 15/08; B32B 27/00

[52] U.S. Cl. .......................... 428/329; 355/271; 355/279; 428/331; 428/332; 428/403; 428/404; 428/421; 428/423.1; 428/447; 428/458; 428/460; 428/461; 428/464; 428/515; 428/906

[58] Field of Search .................................... 428/421, 422, 428/906, 402, 403, 332, 466, 404, 331, 329, 458, 460, 461, 464, 423.1, 447, 515; 355/271, 289, 290, 277, 279; 358/300

[56] References Cited

U.S. PATENT DOCUMENTS

| | | | |
|---|---|---|---|
| 4,272,179 | 6/1981 | Seanor | 355/3 FU |
| 4,379,630 | 4/1983 | Suzuki | 355/3 TR |
| 4,489,148 | 12/1984 | Horgan | 430/59 |
| 4,522,866 | 6/1985 | Nishikawa et al. | 428/126 |
| 5,378,526 | 1/1995 | Murata | 428/906 |

FOREIGN PATENT DOCUMENTS

| | | |
|---|---|---|
| 58-49960 | 3/1983 | Japan . |
| 58-88645 | 6/1983 | Japan . |
| 58-194061 | 11/1983 | Japan . |
| 64-66675 | 3/1989 | Japan . |
| 64-66674 | 3/1989 | Japan . |
| 1-277257 | 11/1989 | Japan . |
| 2-198470 | 8/1990 | Japan . |

*Primary Examiner*—Paul J. Thibodeau
*Assistant Examiner*—Stephen Sand
*Attorney, Agent, or Firm*—Oliff & Berridge

[57] ABSTRACT

A charge roll for electrophotography wherein surface of the roll is formed from a resin layer containing $BaSO_4$ particles coated with $SnO_{2-x}$ (wherein $0 \leqq X \leqq 1$) is disclosed. The charge roll may comprise a roll shaft, an electroconductive elastic layer and the surface resin layer. The charge roll may further comprise an intermediate layer formed between the electroconductive elastic layer and the surface resin layer.

12 Claims, 1 Drawing Sheet

CHARGE ROLL FOR ELECTROPHOTOGRAPHY

FIELD OF THE INVENTION

The present invention relates to a charge roll used in an electrophotographic copying machine.

BACKGROUND OF THE INVENTION

An electroconductive roll used for a charge roll of an electrophotographic copying machine is required to have an electroresistivity in the range about from $10^3$ to $10^9\Omega$ (hereinafter roll resistance means a determined value using an electrode having an area of 1 $cm^2$) and is usually composed of a metal shaft and an electroconductive layer formed on the outer surface of the shaft.

Such kind of electroconductive roll is considered to have preferably an electric resistance level in the range from $10^3$ to $10^9\Omega$ as described above In order to fulfill a sufficient function as a charge roll. The charge roll is required to have an elasticity since the roll is rotated in pressure-contact with the outer surface of a photo-sensitive drum and the outer surface of the photo-sensitive drum is charged with the rubbing friction at the contact area. Thus the above electroconductive layer is generally formed from an electroconductive rubber composition prepared by mixing electroconductive powders or electroconductive fibers (e.g. carbon black, metal powders, metal oxides, carbon fibers) in a synthetic rubber such as silicone rubber (Japanese Patent Unexamined Publication No.Sho-58-49960 and Japanese Utility Model Unexamined Publication No. Sho-58-88645). in addition, a charge roll having an ionic electrophotographic elastic layer which is prepared by using an ionic electroconductivity of a synthetic rubber itself or by adding a high dielectric solution or an ionic material to the synthetic rubber so as to reinforce the ionic conductivity of the above synthetic rubber is also known (Japanese Patent Unexamined Publications No. Hei-1-277257 and No.Hei-2-198470). However, if charging is repeated in a state that the electroconductive rubber layer and the photoreceptor surface are in direct contact with each other, there exist a problem that a low molecular component contained in the rubber layer will migrate into the photoreceptor to cause image defects. Further there exist a problem that the rubber layer will wear out by contacting with the photoreceptor and the roughness of the roll surface is changed largely from the initial state and the uniformity of the charging is deteriorated. Further, when the electroconductivity of the electroconductive rubber layer is high, so called pinhole leak where excessive electrical current flows in defect area of the photoreceptor will occur and image defects will appear.

In order to solve such problems, a resin layer comprising a resin having a lower resistance is formed on The surface of an electroconductive rubber layer as a protective layer (Japanese Patent Unexamined Publications No. Sho-58-194061 and No. Sho-64-66674). However, in the case, resistance values and image concentrations are varied depending on atmospheric conditions. Thus an attempt to add an electroconductive material such as carbon black to the surface resin layer is made but it has a problem that a dielectric breakdown of an photoreceptor or charge roll can not be inhibited depending on the type of the defects of the photoreceptor. Therefore, an attempt to add an electroconductive particles having an electric resistance of $10^1$ to $10^5$ $\Omega$cm to a resin (Japanese Patent Unexamined Publication No.Sho-64-66675). However, the dielectric breakdown can not be inhibited by the attempt, there still exist problems.

As explained above, the conventional charge rolls have problems such as photoreceptor contamination, pinhole leak, atmospheric change of resistance value or deteriorations due to attachment of foreign materials or wear and thus a satisfiable roll has not obtained.

SUMMARY OF THE INVENTION

An object of the present Invention is to provide a charge roll which has a durability, a stable resistance value in spite of any atmospheric conditions, an excellent quality and which will not cause pinhole leak or photoreceptor contamination.

As a result of research and development to attain the above object, the inventors have found that when a roll surface is formed from a resin layer containing $BaSO_4$ particles coated with $SnO_{2-x}$ (wherein $0 \leqq X \leqq 1$) , a charge roll having an excellent quality results thereby completing, the present invention.

Thus a charge roll for electrophotography of the present invention is characterized in that surface thereof is formed from a resin layer containing $BaSO_4$ particles coated with $SnO_{2-x}$ (wherein $0 \leqq X \leqq 1$).

DETAILED DESCRIPTION OF THE INVENTION

Figure 1:
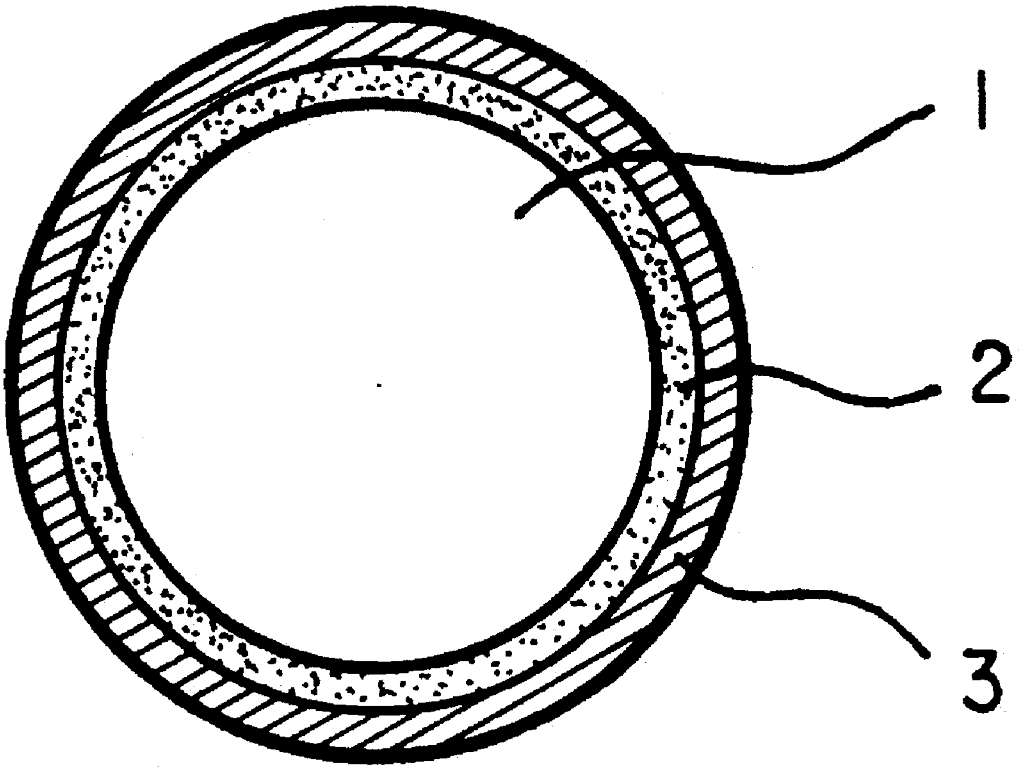
FIG. 1 is a schematic sectional view showing one example of the charge roll for electrophotography according the present invention.

The present invention will be explained in detail. FIG. 1 is a sectional view of a preferable example of a charge roll for electrophotography according to the present invention. In the FIGURE, 1 shows a roll shaft, 2 shows a electroconductive elastic layer, and 3 shows a surface resin layer.

In the present invention, a resin layer containing $BaSO_4$ particles coated with $SnO_{2-x}$ (hereinafter referred as "a surface resin layer") may De formed directly on the surface of the roll shaft. For example, in the case that the surface is used for the purpose of charging a photoreceptor having a strong surface such as amorphous silicon, the surface resin layer may be formed directly on the roll shaft. It, however, is preferably formed via an electroconductive elastic layer formed concentrically at the outer periphery of the roll shaft. In such a case, an intermediate layer may be formed between the above electroconductive elastic layer and the surface resin layer in order to improve adhesion property and insulating pressure resistance.

If the electroconductive elastic layer is formed, a rubber material such as silicone rubber, urethane rubber, fluorine rubber and EPDM, In which a electroconductive material such as carbon black, metal oxide or lithium perchlorate is dispersed, is appropriate.

If the intermediate layer is formed, the material used may be selected from resins and rubber materials. Namely, resins such as polyester, phenol, acryl, polyurethane, epoxy and cellulose, or rubber materials such as epichlorohydrlnethylene oxide copolymer rubber, silicone rubber, urethane rubber and EPDM.

The appropriate resin used for the surface resin layer according to the present invention may include, polyamide, polyester, phenol resin, acrylic resin, polyurethane, epoxy resin, cellulose resin, silicone resin and fluorine resin.

The $BaSO_4$ particles coated by $SnO_{2-x}$ (wherein $0 \leqq X \leqq 1$) have preferably an electric resistance ratio in the range from $10^{-1}$ to $10^7$ Ωcm. The electric resistance ratio may be controlled by changing the value of the x of the $SnO_{2-x}$ and the content thereof. In addition, an element such as antimony or fluorine may be contained in the $SnO_{2-x}$ to provide electroconductivity. The content of $SnO_{2-x}$ in the $BaSO_4$ particles coated by the $SnO_{2-x}$ is in the range from 5 to 90% by weight. The particle size of the $BaSO_4$ coated by the $SnO_{2-x}$ is preferably in the range from 0.01 to 10 μm.

The content of the $BaSO_4$ coated by the above $SnO_{2-x}$ in the surface resin layer is preferably in the range from 30 to 80% by weight and more preferably in the range from 40 to 70% by weight. If the content of the $BaSO_4$ coated by the $SnO_{2-x}$ is lower than the above range, a sufficient charge voltage of the photoreceptor can not obtained and if it is higher than the above range, dielectric breakdown of the surface resin layer will often occur and strength of the film will decrease.

Further, fluorine or sillcone resin particles may be added to the above surface resin layer. In this case the surface is converted to be hydrophobic and acts to inhibit the attachment of impurities to the roll surface. Insulating particles such as alumina or silica may be added to it in order to make the roll surface rough, to lighten the burden at the friction with the photoreceptor and to improve wear resistance properties of both of the roll and the photoreceptor. In addition, a coupling agent may be added to improve adhesive property of the electroconductive elastic layer or the intermediate layer.

In the charge roll for electrophotography according to the present invention, the film Thickness of the surface resin layer is preferably in the range from 5 to 200 μm.

When an electroconductive elastic layer or an intermediate layer is formed, the film thickness of the electroconductive elastic layer is preferably set in the range from 500 μm to 5 mm and the film thickness of the intermediate layer is preferably set in the range from 5 μm to 500 μm.

The charge roll for electrophotography according to the present invention may be prepared e.g. as follows.

An elastomer such as synthetic rubber, in which an electroconductive material such as electroconductive carbon is blended, is winded round the outer surface of a metal shaft, mold-vulcanized and then abraded to have an electroconductive elastic layer. Then a coating solution is prepared by dispersing $BsSO_4$ particles coated by $SnO_{2-x}$ in an solution of a solvent-soluble resin having an excellent durability such as copolymer nylon dissolved in a suitable solvent. The coating solution is coated on the outer surface of the above electroconductive elastic layer and dried.

With the charge roll of the present invention, resistance control may be made by using $BaSO_4$ particles coated by $SnO_{2-x}$ and thus the resistance value of the surface resin layer is not changed depending on an atmospheric condition and a roll having stable characteristics may be obtained. In addition, the surface resin layer in the charge roll according to the present invention have characteristics that electric field dependency of the resistance value is low and pinhole leak may not occur although resin films formed by dissolving another metal oxides or carbon black have large electric field dependencies of resistance values and when high voltages are applied to charge rolls the resistance values decrease rapidly and dielectric breakdowns of the films will occur.

EMBODIMENT

The present invention will be described with examples and comparative examples.

EXAMPLE 1

Methanol was added as a solvent to 45 parts by weight of cellulose resin (cyano resin, manufactured by Shinetsu Kagaku Co.) and 55 parts by weight of electroconductive particles in which $BaSO_4$ particles surfaces are coated by tin oxide (x=1.8) and the mixture was dispersed for one hour with a sand grinder to have a coating solution for forming a surface resin layer. After the viscosity of the coating solution was controlled, it was poured into a dip-coating bath as a dip coating solution. On the other hand, preparing a metal shaft having a shaft diameter of 8 mm-ϕ, EPDM rubber composition In which an electroconductive carbon is blended (hardness 40°, electric resistance $10^4$ Ωm) is winded around the outer surface of it to form an electroconductive layer. The thickness of the electroconductive elastic layer was 3 mm. The metal shaft having the above electroconductive elastic layer was dipped into the coating solution for forming the surface layer, which had been prepared, to be coated. The solvent was removed by drying at 100° C. for 10 minutes to form a surface resin layer. The thickness of the surface resin layer was 20 μm. Thus the object charge roll was obtained.

EXAMPLE 2

A charge roll was obtained in the same manner as described in Example 1 except that polyester resin (VYLON 290, manufactured by TOYOBO Co.) was used in place of cellulose resin.

Comparative Example 1

A charge roll was obtained in the same manner as described in Example 1 except that carbon black (Kerchen Black, manufactured by Aguzo) was used in place of PASTRAN.

Comparative Example 2

A charge roll was obtained in the same manner as described in Example 1 except that electroconductive titanium oxide particles (Titan Black 13M. manufactured by Mitsubishi Material Co.) was used in place of PASTRAN.

Comparative Example 3

A charge roll was obtained in the same manner as described in Example 1 except that methoxymethylated nylon (Rackamide L5003, manufactured by Dainippon Ink Kagaku Kogyo Co.) was used as a surface resin layer.

Each charge roll obtained in Examples 1, 2 and Comparative Examples 1 to 3 was set on electrophotography type printer and images were made repeatedly by applying AC voltage mixed with DC component to charge roll to charge photoreceptor with contacting and rotating organic photoreceptor drum and the charge roll. The rest was carried out under a high pressure and high humidity atmosphere (29° C., 85% RH) and under a low temperature and a low humidity atmosphere (10° C., 15% RH) intermittently. With the charge rolls of Examples 1 and 2, good images were obtained in 20,000 prints.

On the other hand, when charge rolls of Comparative Examples 1 and 2 were used, spot-like defects were occurred after about 100 prints were made under a low temperature and a low humidity atmosphere and the spot-like defects were changed to linear defects. The defects are assumed to be caused by so called pinhole leak by the dielectric breakdown of the photoreceptor.

In addition, when a charge roll of Comparative Example 3 was used, normal images were obtained under a high temperature and a high humidity condition, but images having low contrast were obtained due to poor charge under a low temperature and a low humidity condition. It was assumed that it was owing to change of the resistance value of the surface resin layer depending on atmospheric conditions.

As discussed above, the charge roll for electrophotography has an advantage that pinhole leak may not occur. Further, the resistance value is not changed depending on atmospheric condition and has an excellent characteristic having no contamination of the photoreceptor.

What is claimed is:

1. A charge roll for electrophotography comprising a roll shaft having a surface and a resin layer formed on the surface of said roll shaft, said resin layer containing a plurality of $BaSO_4$ particles coated with $SnO_{2-x}$ in a range from 30 to 80% by weight of said resin layer wherein a content of $SnO_{2-x}$ in the coated $BaSO_4$ particles is in a range from 5 to 90% by weight of the coated $BaSO_4$ particles wherein $0 \leqq x \leqq 1$.

2. A charge roll for electrophotography as claimed in claim 1, wherein the roll further comprises an electroconductive elastic layer between said roll shaft and said surface resin layer.

3. A charge roll for electrophotography as claimed in claim 2 wherein the roll further comprises an intermediate layer formed between the electroconductive elastic layer and the surface resin layer.

4. A charge roll for electrophotography as claimed in claim 2 wherein the electroconductive elastic layer is formed from a rubber material in which an electroconductive material is dispersed.

5. A charge roll for electrophotography as claimed in claim 1 wherein the resin is selected from the group consisting of polyamide, polyester, phenol, acrylic, polyurethane, epoxy, cellulose, silicone and fluorine resins.

6. A charge roll for electrophotography as claimed in claim 3 wherein the intermediate layer is formed from a resin or a rubber material.

7. A charge roll for electrophotography as claimed in claim 1 wherein the $BaSO_4$ particles coated by $SnO_{2-x}$ have an electric resistance in the range from $10^{-1}$ to $10^7$ Ωcm.

8. A charge roll for electrophotography as claimed in claim 1 wherein the particle size of the $BaSO_4$ coated by the $SnO_{2-x}$ is in the range from 0.01 to 10 μm.

9. A charge roll for electrophotography as claimed in claim 1, wherein said surface resin layer further comprises a plurality of particles selected from the group consisting of fluorine resin, silicone resin, alumina, and silica.

10. A charge roll for electrophotography as claimed in claim 1, wherein said surface resin layer has a thickness in a range from 5 μm to 200 μm.

11. A charge roll for electrophotography as claimed in claim 2, wherein said electroconductive elastic layer has a thickness in a range from 500 μm to 5 mm.

12. A charge roll for electrophotography as claimed in claim 3, wherein said intermediate layer has a thickness in a range from 5 μm to 500 μm.

* * * * *